United States Patent [19]
Graunke et al.

[11] Patent Number: 6,041,122
[45] Date of Patent: Mar. 21, 2000

[54] METHOD AND APPARATUS FOR HIDING CRYTOGRAPHIC KEYS UTILIZING AUTOCORRELATION TIMING ENCODING AND COMPUTATION

[75] Inventors: Gary L. Graunke, Beaverton; David W. Aucsmith, Portland, both of Oreg.

[73] Assignee: Intel Corporation, Santa Clara, Calif.

[21] Appl. No.: 09/032,594

[22] Filed: Feb. 27, 1998

[51] Int. Cl.[7] ................................................ H04L 9/00
[52] U.S. Cl. .................................. 380/21; 380/1; 380/28
[58] Field of Search ................................ 380/21, 24, 23, 380/30, 44

[56] References Cited

U.S. PATENT DOCUMENTS

| | | | |
|---|---|---|---|
| 4,649,233 | 3/1987 | Bass et al. ................................ | 380/21 |
| 4,878,246 | 10/1989 | Pastor et al. ............................. | 380/44 |
| 4,912,762 | 3/1990 | Lee et al. ................................. | 380/24 |
| 4,956,863 | 9/1990 | Goss ......................................... | 380/30 |
| 5,201,000 | 4/1993 | Matyas et al. ............................ | 380/30 |
| 5,202,921 | 4/1993 | Herzberg et al. ......................... | 380/23 |
| 5,369,708 | 11/1994 | Kawamura et al. . | |

OTHER PUBLICATIONS

Kocher, Paul C. "Timing Attacks on Implementations of Diffie–Hellman, RSA, DSS, and Other Systems" Advances in Cryptoolgy Crypto '96, 1996.

Kocher, Paul C. Timing Attacks on Implementations of Diffie–Hellman, RSA, DSS, and Other Systems "Advances in Cryptology" Crypto '96.

"Timimg Attacks on Implementations of Diffie–Hellman, RSA, DSS, and Other Systems", by Paul C. Kocher, published in "Advances in Cryptology", Crypto '96, pp. 104–113, Lecture Notes in Computer Science #1109.

*Primary Examiner*—Gail O. Hayes
*Assistant Examiner*—Christopher M. Tucker
*Attorney, Agent, or Firm*—Blakely, Sokoloff, Taylor & Zafman LLP

[57] ABSTRACT

A method and apparatus for hiding cryptographic keys based on autocorrelation timing attacks is provided. The method and apparatus of the present invention utilize a autocorrelation timing attack to allow independent software entities to authenticate themselves without storing a private cryptographic key. This is accomplished by storing timing statistics related to the evaluation of an equation in the software entity rather than the cryptographic key itself. When the software entity authenticates itself, the cryptographic key is derived based on information provided by the timing statistics contained in the software entity.

56 Claims, 11 Drawing Sheets

METHOD AND APPARATUS FOR HIDING CRYTOGRAPHIC KEYS UTILIZING AUTOCORRELATION TIMING ENCODING AND COMPUTATION

FIELD OF THE INVENTION

The present invention relates to maintaining the secrecy of cryptographic keys, and more specifically, to a method and apparatus for hiding cryptographic keys in software utilizing autocorrelation timing encoding and computation.

BACKGROUND OF THE INVENTION

The evolution of electronic commerce and other network computing paradigms, such as the Internet, have increased the need for self-contained software entities. Such entities include intelligent agents, content containers, and network crawlers that are frequently required to authenticate themselves to other software entities, such as firewalls. This authentication must be performed without human intervention.

Authentication can be made by using one or more of the following bases (1) something you have; (2) something you are; or (3) something you know. Only the third basis is available to independent software entities. Inherent in authentication based on something you know is that the something you know is a secret. However, it is a known problem to maintain a secret in software.

One attack on secrets stored in independent software entities is disclosed in "Timing Attacks on Implementations of Diffie-Hellman, RSA, DSS, and Other Systems", by Paul C. Kocher, published in "Advances in Cryptology", CRYPTO '96, p. 104, Lecture Notes in Computer Science #1109, which describes an autocorrelation timing attack using a simple a series of computations method that may be tailored to work with any implementation of ciphers with sufficient timing variance in their implementations. The attack is effective because most cryptographic operations contain code segments that execute differently depending on the value of the segment of cryptographic key used in an operation. For example, public key computations involve long series of modular exponentiations. The standard methods of doing the modular exponentiations utilize power trees that have different operations depending on whether the current bit is a 1 or a 0. It may appear that only a small amount of information, such as the Hamming weight of the cryptographic key would be ascertainable, or that noise in the system would overwhelm the information sought, however, Kocher has shown that neither of these assumptions is accurate.

The autocorrelation timing attack may be explained by showing how timing information can be used to derive the individual secret component, X, of a Diffie-Hellman key exchange. The Diffie-Hellman key exchange is used to allow two parties, Alice and Bob, to mutually agree upon a secret, Z. The two participating parties agree on g and p, both of which may be known to an adversary. Alice generates a personal secret $X_A$ and computes $$Y_A = g^{X_A} \bmod p. \quad \text{Equation 1}$$

Bob generates a personal secret $X_B$ and computes $$Y_B = g^{X_B} \bmod p. \quad \text{Equation 2}$$

Alice and Bob then publicly exchange $Y_A$ and $Y_B$. Thus, an adversary may know g, p, $Y_A$ and $Y_B$. Alice then computes $$Z = Y_B^{X_A} \bmod p \quad \text{Equation 3}$$

and Bob computes $$Z = Y_A^{X_B} \bmod p. \quad \text{Equation 4}$$

The Zs are equal and are thus a shared secret.

An autocorrelation timing attack can be utilized to allow an adversary to derive $X_B$ if Bob uses the same value of $X_B$ in very many exchanges. The attacker first observes k exchanges, measuring the time, t, taken by Bob to compute Equation 2. This can be accomplished by using the following algorithm to compute $Z = g^X \bmod p$:

Let $Z_0 = 1$

Let $g_0 = g$

FOR $i = 0$ upto (bits_in_$X - 1$)

IF (bit $i$ of $X$) is 1 THEN

Let $R_{i+1} = (R_i)(g_i) \bmod p$

ELSE

Let $R_{i+1} = R_i$

Let $g_{i+1} = R_{i+1}^2 \bmod p$

Thus, an adversary who knows bits $b_0 \ldots b_{n-1}$ of X can compute $b_n$. To compute all of the bits, the attacker starts with bit $b_0$ and monitors the amount of time required to evaluate Equation 2.

For a few $R_b$ and g values, the calculations of $R_{b+1}$ will be slow, and the attacker may know which calculations are slow by monitoring the length of time required to execute a modular exponention of $R_{b+1}$. If the calculation is slow, the bit is set. If there is no relationship between the time required to compute $R_{b+1}$ and the total processing time, the bit is clear.

Typically, the timing difference between a clear bit and a set bit are not extreme, but do have enough variation to allow the attack to work. For each g, the attacker can estimate d, a measure of the time expected to complete $(R_b)(g_t) \bmod p$. The attacker also knows the total time t to compute $g^X \bmod p$. Because the first b exponent bits are known, the attacker knows $R_b$ and can measure c, the amount of time required for the first b iterations of the exponentiation loop.

Given g, t, c and d for one timing measurement, the probability, P, that a bit b is set is:

$$P(g, t, c, d) \approx \frac{\phi\left(\frac{(t-c-d)-\mu(t-c-d)}{\sigma(t-c-d)}\right)}{\phi\left(\frac{(t-c)-\mu(t-c)}{\sigma(t-c)}\right) + \phi\left(\frac{(t-c-d)-\mu(t-c-d)}{\sigma(t-c-d)}\right)} \quad \text{Equation 5}$$

where $$\phi(x) = \frac{e^{\frac{-x^2}{2}}}{\sqrt{2\pi}} \quad \text{Equation 6}$$

is the standard normal function, $$\mu(x) = \frac{\sum_{i=0}^{n-1} x_i}{n} \qquad \text{Equation 7}$$

is the mean of x, and $$\sigma(x) = \sqrt{\sum_{i=0}^{n-1} \left(\frac{x_i^2}{n-1}\right) - \left(\sum_{i=0}^{n-1} \frac{x_i}{n-1}\right)^2} \qquad \text{Equation 8}$$

is the standard deviation of x. Thus, the overall probability that a bit is set is:

$$P(bit = 1) \approx \frac{\prod_{i=0}^{k-1} P(g_i, t_i, c_i, d_i)}{\prod_{i=0}^{k-1} P(g_i, t_i, c_i, d_i) + \prod_{i=0}^{k-1} (1 - P(g_i, t_i, c_i, d_i))}. \qquad \text{Equation 9}$$

For the attack to work, the probabilities do not need to be very large, because incorrect bit guesses destroy future correlations. After a mistake, no new significant correlations are detected. Thus, the attacker can backtrack through the most recent bits and modify them. It is important to note that this timing attack works in the presence of external system timing noise because it is based on autocorrelation of small code segments. As computers increase in design complexity, the effects of debugging and program monitoring facilities greatly increase the execution time and, more importantly, variance. Thus, an autocorrelation timing attack may run in the background on a personal or similar computer to obtain the user's secret key.

The difference between the attacker's computer and the victim's computer is also a source of variance not related to the key. To overcome this noise, as well as the noise of the normal system interruptions, the attacker simply needs more samples. The attacker's computer may even be the same computer system as victim's computer, but timing differences may be due to monitoring or tracing the victim's code by the attacker. The attacker may even own the victim computer hardware, but not the software that is run on the hardware, such as in video-on-demand systems.

While the number of samples is directly proportional to the number of bits in the key, the number of samples must also increase in proportion to the square of the timing noise. For example, if N samples are needed to derive they key in computations having a "signal" variance of $V_s$, and a "noise" variance, $V_n$, the expected number of samples, N', needed to derive the key is:

$$N' = N((V_s + V_n)/V_s)^2 \qquad \text{Equation 10}$$

Thus, increased noise introduces more variance, which is overcome by increasing the number of samples required by the attacker. Therefore, it would be desirable to provide a method and apparatus for storing statistics related to a series of computations using a cryptographic key rather than storing the cryptographic key.

SUMMARY OF THE INVENTION

A method and apparatus for storing a plurality of timing statistics generated based on a cryptographic key in an electronic device, such that the device may derive the cryptographic key comprising is disclosed. A plurality of timing statistics based on an amount of time required for a sequence of related computations used in deriving the key are generated. When authentication is required, the electronic device derives the key in a bitwise fashion by guessing whether bits of the key are clear or set, wherein derivation of the key utilizes the timing statistics stored in the electronic device to determine whether bits guessed in the derivation correspond to bits in the cryptographic key only in the absence of program monitoring.

BRIEF DESCRIPTION OF THE DRAWINGS

The present invention is illustrated by way of example, and not by way of limitation, in the figures of the accompanying drawings in which like reference numerals refer to similar elements and in which.

DETAILED DESCRIPTION

A method and apparatus for storing statistics related to computation of cryptographic keys based on autocorrelation timing information is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid obscuring the present invention.

The method and apparatus of the present invention utilize a autocorrelation timing statistics to allow independent software entities to authenticate themselves without storing a private cryptographic key. This is accomplished by storing timing statistics related to the evaluation of Equation 2 in the software entity rather than the cryptographic key itself. When the software entity authenticates itself, the cryptographic key is derived based on information provided by the timing statistics contained in the software entity. Derivation is performed in a bitwise fashion and is based on guesses as to whether a bit is set or clear. After each guess timing information is compared to stored statistics to determine whether past guesses were correct. Interference such as timing by using debug registers by attackers destroys future correlations thereby preventing an attacker from deriving the cryptographic key through a timing attack.

Figure 1:
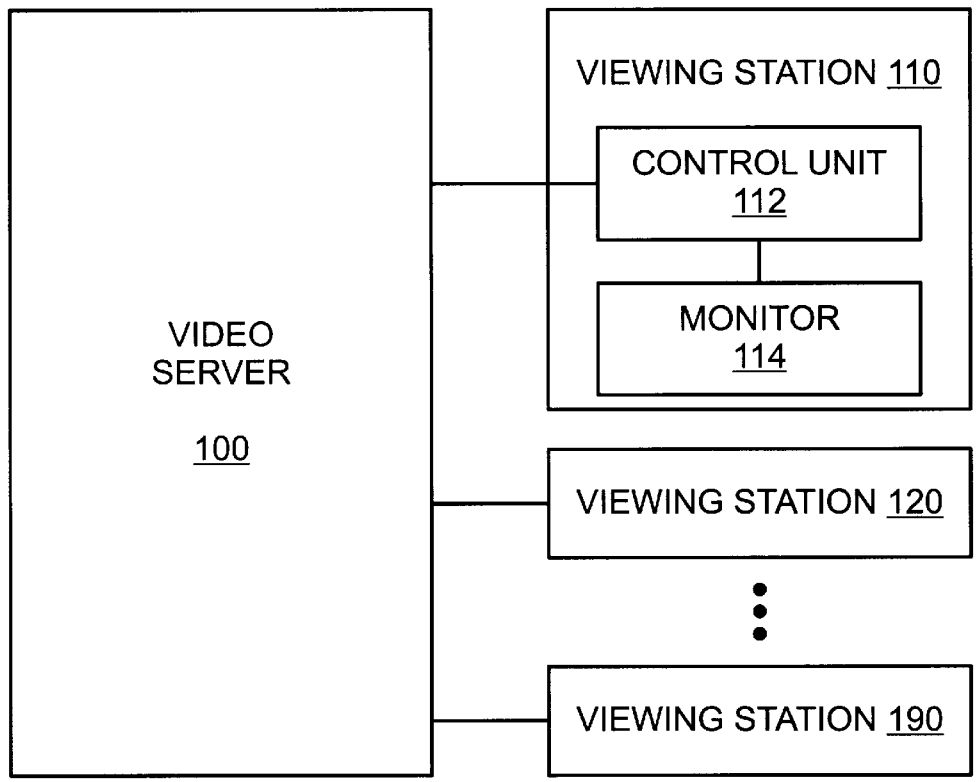
FIG. 1 is a block diagram of one embodiment of a video on demand viewing system according to the present invention.

FIG. 1 is a block diagram of one embodiment of a video-on-demand viewing system according to the present invention. Video server 100 is connected to a plurality of viewing stations, such as viewing stations 110, 120 and 190. Each viewing station comprises control unit 112 coupled to monitor 114 that are independently addressable. Control unit 112 provides an interface between video server 100 and monitor 114 and allows a user to select videos to be viewed on monitor 114. Control unit 112 contains an independent software entity that authenticates itself to video server 100, such that video server 100 can be certain that the video provided will be sent to the appropriate viewing station. The independent software entity contained in each control unit may compute a secret cryptographic key in accordance with the present invention to identify the viewing station to video server 100.

Figure 2:
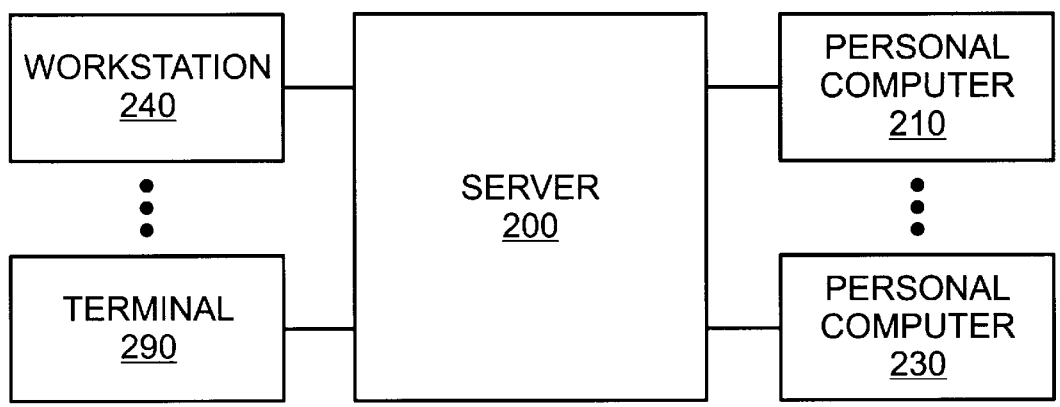
FIG. 2 is a block diagram of one embodiment of a computer network according to the present invention.

FIG. 2 is a block diagram of one embodiment of a computer network according to the present invention. Server 200 provides resources and data to the devices connected to it. These device may include, for example, personal computers such as personal computers 210 and 230. Devices connected to server 200 may also include workstations, such as workstation 240 and terminals, such as terminal 290. Any other appropriate device may also be connected to server 200. Each device connected to server 200 may contain an independent software entity that allows the device to authenticate itself to server 200. The independent software entities may authenticate themselves according to the present invention.

Figure 7:
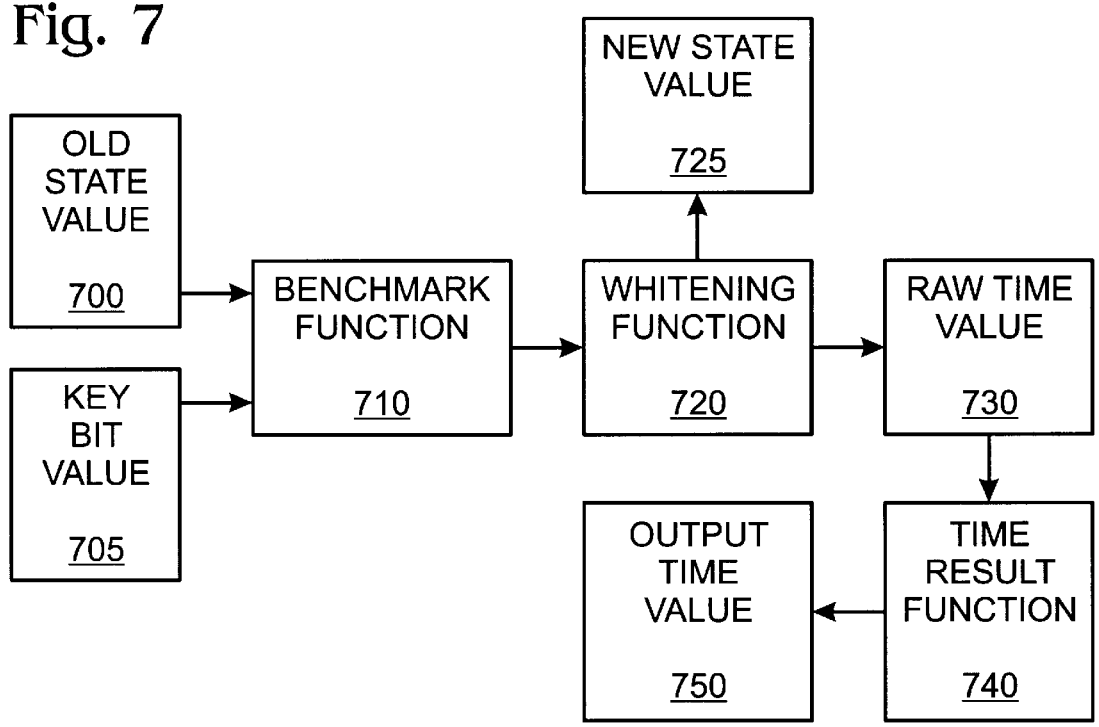
FIG. 7 is one embodiment of a functional block diagram of the timed function according to the present invention.

FIG. 7 is one embodiment of a functional block diagram for encoding a cryptographic key according to the present invention. Old state value 700 and key bit value 705 are input values to benchmark function 710. In one embodiment, for the first evaluation of benchmark function 710, old state value 700 is a random number. For subsequent evaluations of benchmark function 710, old state value 700 is the new state value 725 generated by a previous evaluation of whitening function 720. Alternatively, old state value 700 may be a random number for all evaluations of benchmark function 710. Key bit value is one or more bits of the cryptographic key to be encoded.

In one embodiment, benchmark function 710 determines the next prime number greater than old state value 700. Because the relationship between old state value 700 and the next greater prime number is unknown, the amount of time required to evaluate benchmark function 710 varies. The variableness of time required to evaluate benchmark function 710 for different old state values 700 is used to encode and decode cryptographic keys. In one embodiment, a pseudo-primality function is used for benchmark function 710. Alternatively, other mathematical functions that provide unpredictable evaluation timing may be used.

The output of benchmark function 710 is input to whitening function 720. Because randomness is desirable in new state values 725 generated by encoding processing, whitening function 720 is used to prevent clustering of values that would otherwise be used for new state values 725. In one embodiment, whitening function 720 is a message digest or similar function. The time required for evaluation of whitening function 720 is not required to be variable because variation in timing is provided by benchmark function 710. However, whitening function 720 may provide a variable timing for evaluation.

The output of whitening function 720 is new state value 725 and raw time value 730. In one embodiment, new state value 725 is fed back to benchmark function 710 as old state value 700. Raw time value 730 is the amount of time required to evaluate benchmark function 710 and whitening function 720.

Raw time value 730 is input to time result function 740, which uses one or more bits of raw time value 730 to generate output time value 750. Any single bit of raw time value 730 may be used as output time value 750; however, such an embodiment is immune to timing interruptions, which would allow an attacker to observe the decoding process. Using the complete raw time value 730 results in an embodiment that is too sensitive to normal system interruptions and does not consistently and correctly encode and decode cryptographic key values.

In one embodiment, the seven least significant bits of raw time value 730 are used to generate output time value 750; however, a different number of bits may be used. Output time value 750 is used subtracted from a total time value required for encoding and decoding. The number of bits from raw time value 730 used for output time value 750 are chosen such that the encoding process is immune to normal system interrupts, but increasing timing variance when an abnormally high number of interrupts occur. By selecting the seven least significant bits of raw time value 750, the precision of timing measurements is provided according to the desired precision, and thus the tolerance to the number of interrupts that may occur without disruption of variance measurements enough to prevent the key from being properly encoded and decoded. The length of the interrupts is not important.

Figure 3:
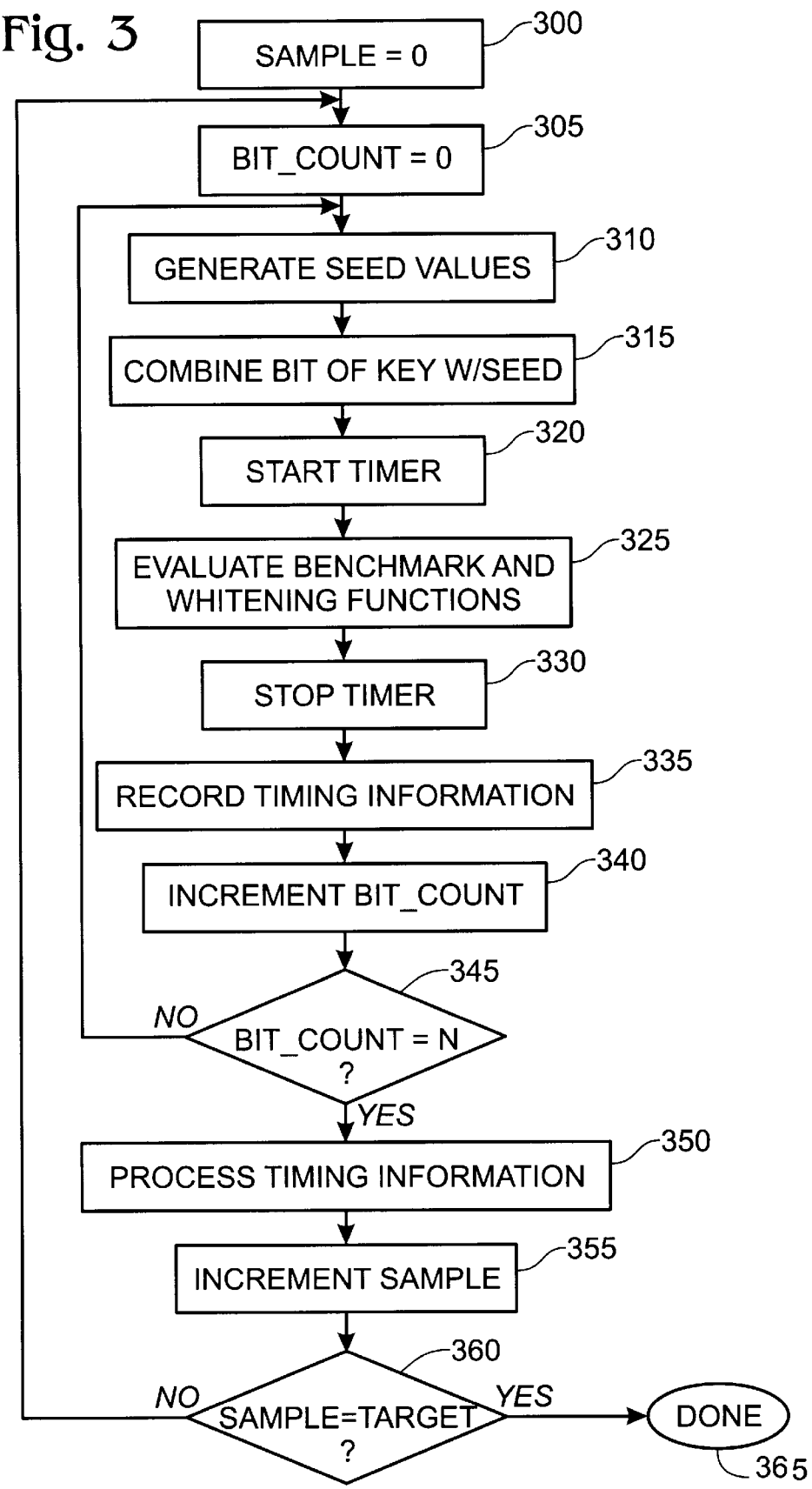
FIG. 3 is a flow diagram of one embodiment for encoding a segment of a cryptographic key in a friendly environment according to the present invention.

FIG. 3 is a flow diagram of one embodiment for encoding a cryptographic key in a friendly environment according to the present invention. Of course, any other method that provides timing statistics based on key derivation having sufficient variance may also be used.

In step 300 the SAMPLE variable is set to 0. This variable is used to count iterations of the evaluation process to so that the correct number of samples are processed. The number of samples per bit required depends on a number of factors including clock speed of the timing clock, key size and system noise. Slower clock speeds and noisier systems require more samples per bit. However, it is important to note that excessive bits per sample may allow timing attack interference to be treated as noise and filtered out. According to one embodiment, six samples per bit are processed. However, a different number of samples per bit may also be used.

In step 305 the BIT_COUNT variable is set to 0. This variable is used to count the number of bits evaluated. Each sample contains a number of bits to be evaluated along with a seed value for each sample. In one embodiment, 100 seed values are used.

A seed value is generated for the bit to be encoded in step 310. According to one embodiment, each seed value is a 128 bit integer, however, other seed sizes may also be used. The larger the seed value, the less chance of collisions between the states reached by two key bits during encoding and decoding. The seed values must have more bits than the number of key and pad bits being encoded in a segment.

In step 315 the seed value is combined with a bit from the key to be encoded. The resulting number is 128 bits (i.e., a 128 bit seed plus a one bit corresponding to a guessed key bit). This is the number to be used as an input to a benchmark function, the evaluation of which provides timing information for autocorrelation statistics. Combination of the seed value with the key bit may be performed by a variety of operations. In one embodiment, the two numbers are concatenated. Alternatively, the two numbers may be logically ANDed, ORed, EXORed, etc.

As discussed above, the benchmark function combines an old state value with the key bit to produce a new state value and a raw time value. Variableness of timing in evaluation of the benchmark function is responsible for providing timing variations for statistics that are used for encoding and decoding cryptographic keys. Whitening of the output of the benchmark function is provided to avoid state collisions during encoding and decoding. State collisions occur when multiple state value are equal to each other. In one embodiment, an entire random state space is used to avoid collisions between key values. The time required for evaluation of the benchmark function and whitening is processed to produce the time output that is used for statistical purposes.

In step 320 a timer is started to time evaluation of the number generated in step 315. According to one embodiment, a 0.8 microsecond clock available on Intel® microprocessors of the 486 generation or later available from Intel Corporation of Santa Clara, Calif., is used. However, other timing devices and procedures may also be used. It is important to note that the finer, or shorter, the timing intervals available, the fewer samples are required. Conversely, the courser, or longer, the timing interval available, the greater the number of samples required.

Step 325 is the evaluation of the benchmark and whitenting functions, the time to completion of which is the timing information sought for encoding purposes. In step 330 the timer started in step 320 is stopped. The timing information obtained therefrom is added used to generate timing information for evaluation of the key.

In step 340 BIT_COUNT is incremented to indicate that a bit has been processed. Steps 310 to 340 are repeated for each successive bit in the key to be encoded. According to one embodiment, an additional number of bits (a pad) are provided to generate enough statistical data for the low-order bits of the key to be processed in the same manner, however, the low order bits of the key may be processed in another manner. In one embodiment, the pad is 24 bits; however, other pads sizes may also be used.

Once it is determined that the bits in a sample have been processed, in step 345, the time taken to process the bits in the sample is processed in step 350.

In step 355 SAMPLE is incremented and steps 305 to 350 are repeated for the next sample to be processed. This process continues until, in step 360, it is determined that the appropriate number of samples have been processed. If the appropriate number of samples have been processed, encoding in complete in step 365.

The encoded key should be checked. If it fails to decode to the original key value, other seed values should be chosen. Repeated failures indicate that the state size is too small relative to the number of key bits being encoded in each segment.

Figure 4:
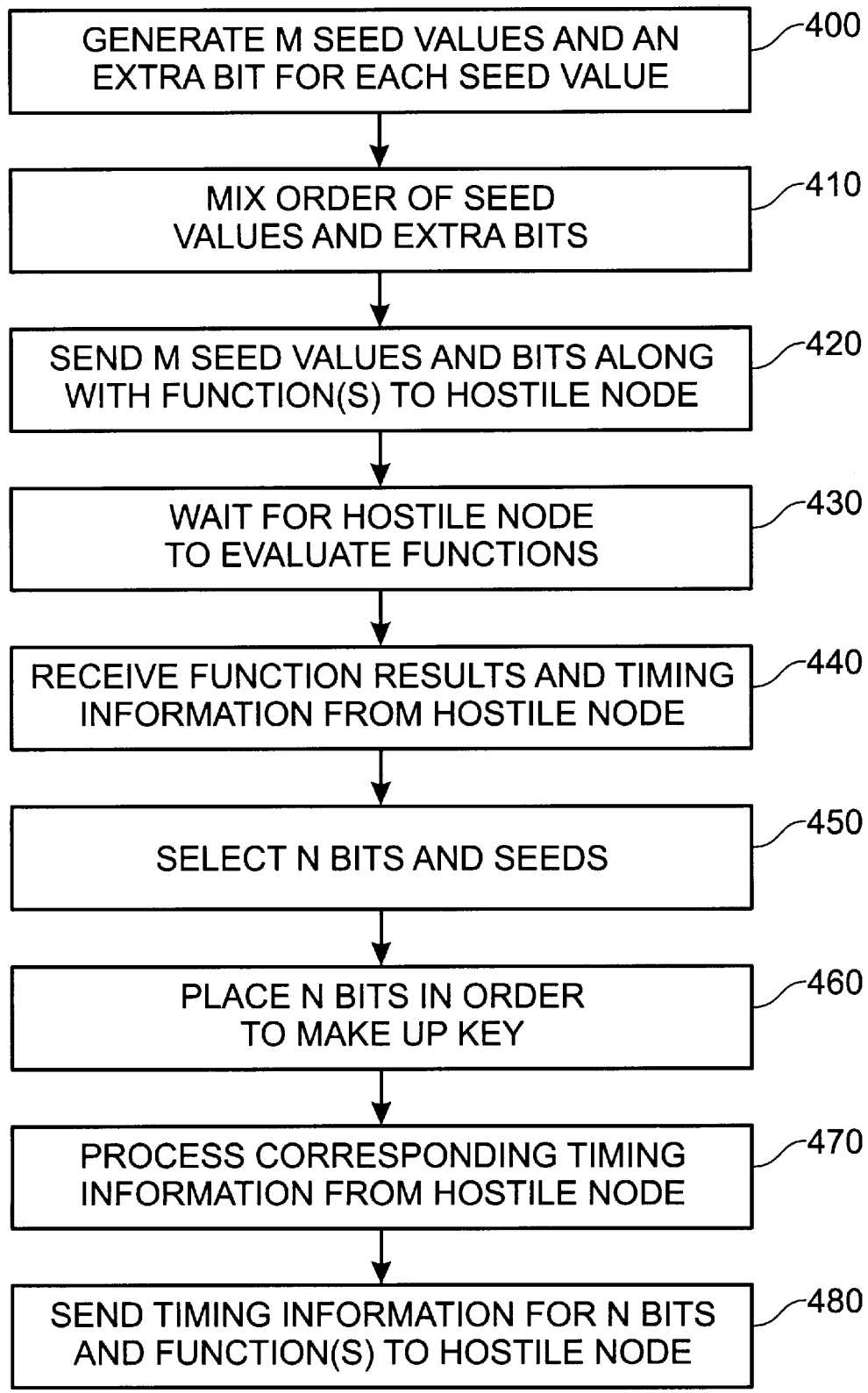
FIG. 4 is a flow diagram of one embodiment for encoding a cryptographic key in a hostile environment according to the present invention.

FIG. 4 is a flow diagram of one embodiment for encoding a cryptographic key in a hostile environment according to the present invention. The steps in FIG. 4 are performed on a trusted server that can communicate with the hostile host.

In step 400, M seed values along with extra bits to be encoded are generated. According to one embodiment, M is much larger than the number of seed values required for a friendly environment, as described above with respect to FIG. 3. The manner in which seed values and bits are generated for encoding a key for a hostile user is the same as for encoding a key for a friendly user. The only difference is that a much greater number of seed values and associated bits are generated when the key is to be encoded for a hostile environment. In a hostile environment the additional bits are arbitrary bits that do not correspond to the key to be encoded. When encoding in a hostile environment, M is much larger then N so that the hostile host cannot predict the bits that form the cryptographic key. In a hostile environment only the benchmark function 710 is evaluated. The whitening function 720 is kept secret.

In step 410 the order of the seed values and associated bits are mixed. This is an additional guard against predicting the bits that are used in the key.

In step 420 the M seed values and associated bits are sent to the hostile host. One or more functions to evaluate using the seed values and bits are also sent. According to one embodiment, only one function is used and that function finds the next prime number greater than the seed value and bit evaluated. However, alternative functions may be used and multiple functions may be used. For example, half of the values may be evaluated by one function and the other half of the values may be evaluated by another function.

The trusted server then waits for a response from the hostile host in step 430. If the hostile host takes too long to evaluate the seeds and functions, which indicates that the hostile host is performing an attack, the trusted server may abandon the process. In step 440 the trusted server receives function results and timing information from the hostile host, if offered within an acceptable window of time.

In step 450 the N bits that form the key to be encoded are selected and the remaining seeds and bits are discarded. In step 460 the N bits selected are placed in order such that the bits form the key.

In step 470 the timing information received from the hostile host is processed. The trusted server determines an expected time, t, for the host to process a sample. Finally, in step 480 the timing information for the N bits and the function or functions are sent to the hostile host.

Figure 8:
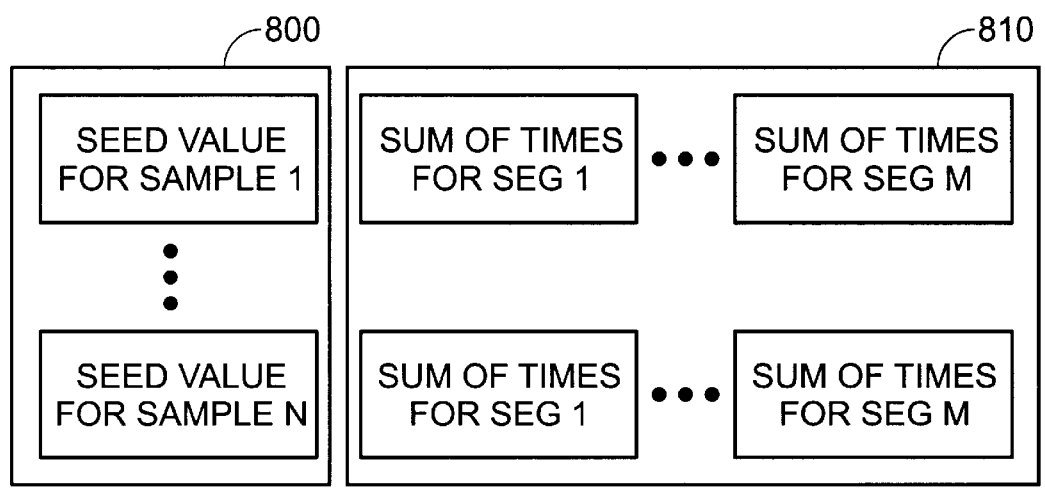
FIG. 8 is one embodiment of an encoded cryptographic key representation according to the present invention.

FIG. 8 is one embodiment of an encoded cryptographic key representation according to the present invention. In one embodiment, the cryptographic key size in bits is known, the segment size, if the key is broken into multiple segments for encoding/decoding is known, and the number of samples used for encoding and decoding is known.

Seed value 800 is a random number generated to start the decoding process. Vector of time sums for each key segment 810 is a vector of evaluation times for the number of samples used and the number of bits in a segment summed. Vector 810 represents a total time required for encoding the cryptographic key and is an expected time required for decoding of the key value. By having a total time value for each sample and segment, the time required for benchmark evaluation for each sample and key bit may be subtracted from the total value to determine whether variance has been decreased or increased by a particular bit selection.

Figure 5:
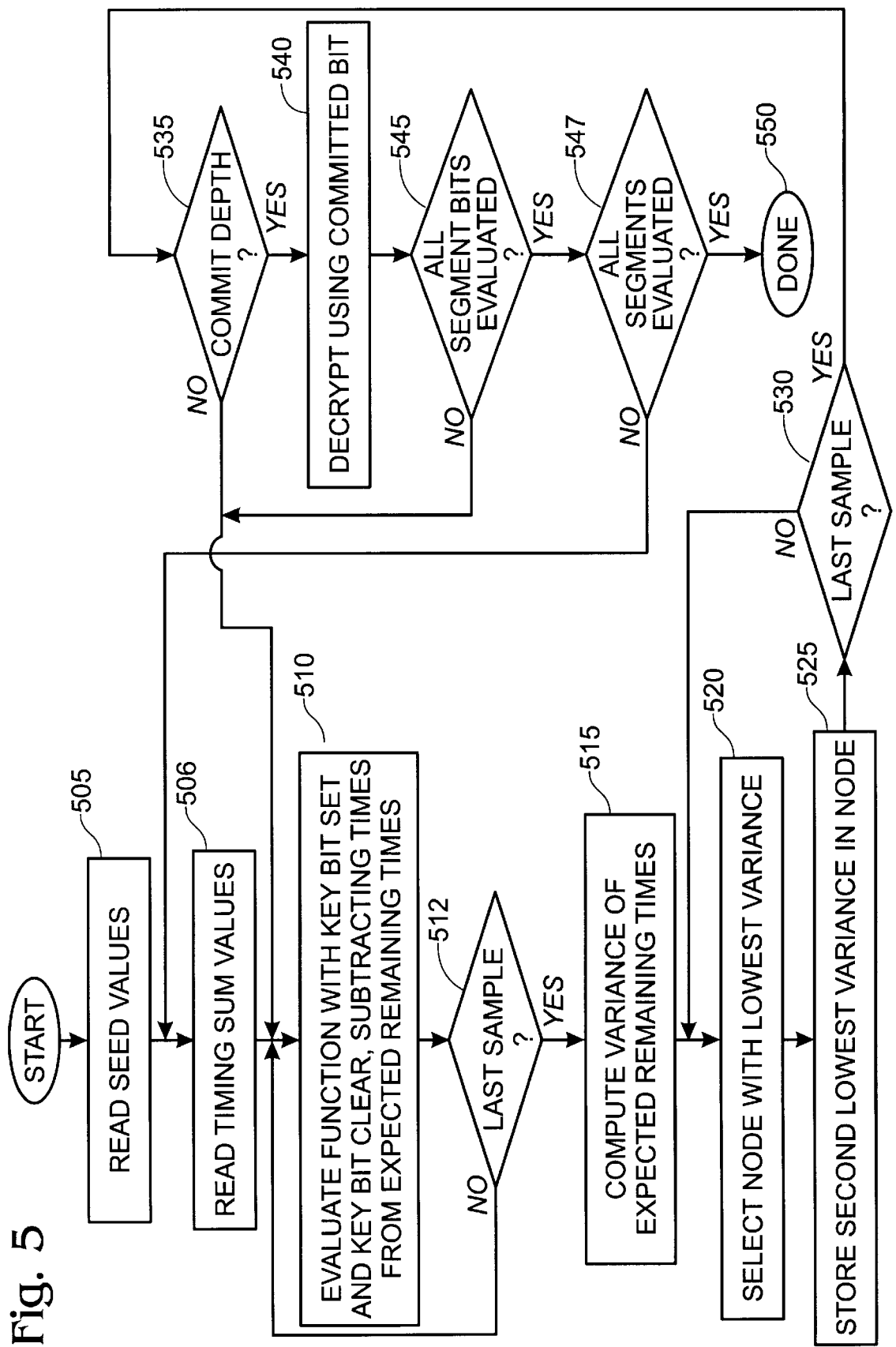
FIG. 5 is a flow diagram of one embodiment of deriving a segment of a cryptographic key for use according to the present invention.

FIG. 5 is a flow diagram of one embodiment of deriving a cryptographic key for use according to the present invention. For the method of deriving a cryptographic key described in FIG. 5, the method includes the steps of storing the second lowest variance of the nodes related to the current node is described. However, any method of exploring a search tree that allows determination of the leaf node having the lowest variance may be used.

In step 505 a random seed value and first time sum is read for each sample to be evaluated. In step 510 the benchmark function is evaluated for each seed value combined with a set bit and with a clear bit. Each evaluation of the function is timed. The time required for evaluation of the benchmark evaluation is subtracted from the time sum associated with the respective seed values.

The time required to evaluate the function for the guessed bit is subtracted from a total expected time, t, for each sample. The variance, $\sigma^2$, of the remaining expected time is computed. These evaluations corresponding to the set bit and to the clear bit may be thought of as child nodes in a search tree, where each level in the search tree corresponds to a bit in the key. In this search tree the leaf node with the lowest variance is expanded through evaluation of the function in an attempt to guess at the next bit in the key. When the variance of the expected remaining times for each sample begins to grow after decreasing, the path chosen is the incorrect one, and nodes are backtracked.

In step 520 the related node with the lowest variance that has not been previously selected is selected. Related nodes are the two child nodes of the current node as well as the parent node of the current node. The node with the lowest variance is most likely to be the node representing the correct bit in the key.

After a node is selected, the node having the second lowest variance of the remaining nodes not previously selected is stored in step 525. This step allows for backtracking without reevaluating the variance of the related nodes. If it is determined later that the selected node was the incorrect node, and the node having the next lowest variance is most likely, of the remaining related nodes, to represent the correct node. At this time the node selected first can be ignored because it has been determined that the node lies in the incorrect path.

If the second node to be selected is determined to be the incorrect node, the remaining node that has not been selected is selected and evaluation continues from that node. The variance of the third node selected does not have to be stored because it is the only remaining node and thus has the lowest variance of the nodes not previously selected.

It should be noted that step 525 is only one of many methods for expanding a search tree. Any method that allows for the identification and expansion of a leaf node having a particular characteristic among the leaf nodes, such as the lowest variance, may be used. In other words, any method for identification of the correct path from the root node through the search tree representing the correct cryptographic key may be implemented without deviating from the spirit and scope of the present invention.

In step 535 it is determined whether the node selected is at commit depth. The commit depth is the number of bits (i.e., depth in the search tree) at which the probability that the bit at the top of the commit depth is the correct bit is satisfactory. In one embodiment, the commit depth is 24. Thus, after evaluating 24 levels into the search tree, the first bit is committed. Similarly, after evaluating 25 levels into the search tree the second bit is committed, and so on. Other commit depths may also be used. The probability that the bit at the top of the commit depth is correct can be estimated by evaluating Equation 5. The deeper the commit depth, the higher the probability that the bit to be committed is correct; however, a larger commit depth also increases the memory required to evaluate the search tree.

As noted above, extra bits may be appended to the key when it is encoded to provide timing information for the low order bits of the key. According to one embodiment, the number of extra bits is equal to the commit depth. Thus, evaluation of the last bit in the pad corresponds to committing the last bit of the key. Fewer bits may be appended to the key, however, this requires alternative derivations for the low order bits in the key. It is important to note that number of samples required to derive a key is determined by the first node evaluated. As bits are committed and the search tree is traversed, the number of samples relative to the number of remaining bits grows, which gives more samples per bit and more accurate timing information.

When the commit depth has been reached and a bit has been committed, the a series of computations step of decryption is performed in step 540. The bits are used as they are committed so that the bits that form the key are not stored in memory such that an attacker may observe the key. Thus, if an attacker disrupts the derivation process by observing, at most one bit will be obtained. Because of the variable amount of time required to evaluate the function, the timing of committing bits is not regular and thus is difficult to observe.

In step 545, it is determined whether all of the bits in the sample have been evaluated. If so, the process is complete and decryption has been accomplished. If not, steps 510 to 540 are completed for the remaining bits in the sample if the newly selected node is not a leaf node. If the newly selected node is a leaf node, steps 520–540 are repeated for the newly selected node. The newly selected node is checked to determine whether it is a leaf node in step 555.

The foregoing discussion with respect to FIGS. 3–5 assume that the cryptographic key is encoded and computed one bit at a time. However, multiple bits may be encoded or computed in each step by combining the bits to be encoded or decoded to the seed value. Encoding a decoding multiple bits changes the search tree from a binary one to one where each node has $2^n$ child nodes, where n is the number of bits encoded or computed per step.

FIGS. 6a–6i are one embodiment of an exemplary search tree for deriving a cryptographic key for use according to the present invention. For purposes of the example related to FIGS. 6a–6i, the commit depth is 5 and the variance, $\sigma^2$, is simplified. The values of $\sigma^2$ shown represent the variance across a vector of time values, $\hat{t}$, (not shown) corresponding to evaluation of the respective seed values used during expansion of the current node. For simplicity, the variance values shown in the node in which it is contained and not the variance of the second best related node as described with respect to FIG. 5. Also, the child nodes on the left of its parent represent a key bit that is clear and the child nodes on the right of its parent represent key bits that are set. For example, selecting node 610 represents a path from node 600 to node 610 and indicates a clear bit for the first bit of the key.

Figure 6A:
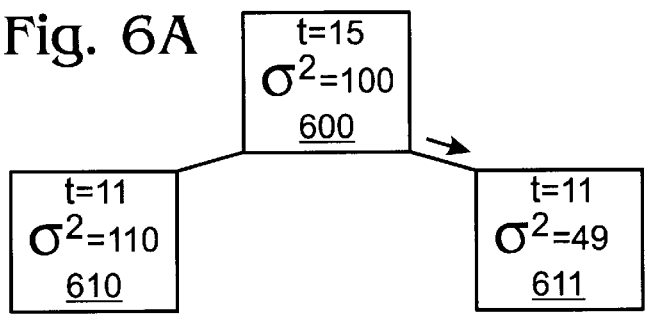
FIGS. 6a–6i are one embodiment of an exemplary search tree for deriving a cryptographic key according to the present invention.

In FIG. 6a, the first or root node 600 is evaluated. The value of $\sigma^2=100$ is the variance that is determined as a result of the encoding process as described with respect to FIGS. 3 and 4 and not the result of evaluating a new set of seed values for cryptographic key computation purposes. To expand node 600 the seed values along with a clear bit are evaluated in the function provided and timing information is collected. These evaluations correspond to node 610. Assume for this example that the variance of the times required for evaluation is 50. Thus, $\sigma^2=50$ for node 610.

Node 611 is similarly evaluated with a set key bit. The resulting variance is $\sigma^2=49$. Because node 611 has a lower variance than node 610, it is assumed that the first bit of the key is set and node 611 is selected and expanded.

Figure 6B:
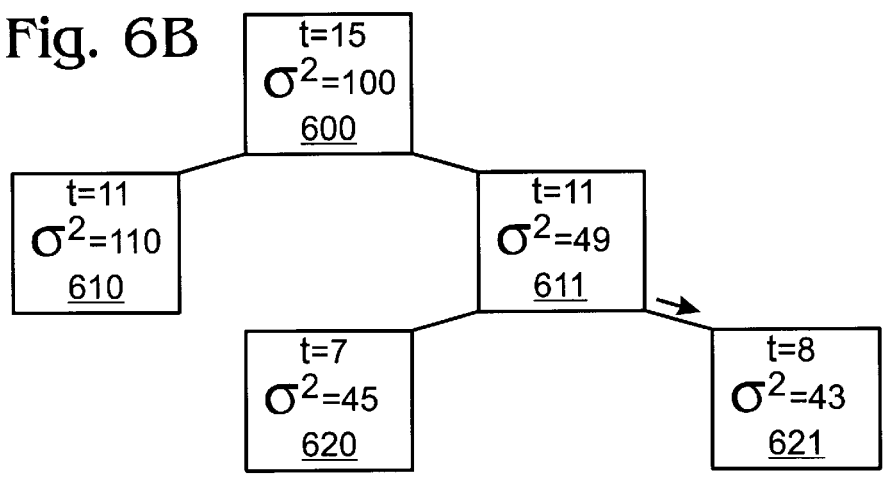

FIG. 6b is an expansion of node 611. The function is evaluated for new seed values that are the output of the function when evaluating node 611 (i.e., the whitened prime number output by the function in evaluating the last seed value) and key bit. Node 620 represents a clear key bit and node 621 represents a set key bit. Node 621 is selected because $\sigma^2=43$ in node 621 is less than $\sigma^2=45$ in node 620. Thus, node 621 is the leaf node in the search tree with the lowest variance and, as such, is the next node expanded.

It is important to note that moving down a level in the search tree reduces the expected times in, t, because an additional bit has been evaluated, which reduces the time to evaluate the remaining bits. However, variance does not necessarily decrease as a lower level node in the tree is evaluated. If the selected node represents an incorrect guess, the correlation between the statistics that represent the actual key and the guesses decrease, which results in a larger variance. Thus indicating that the path chosen in the search tree is the incorrect one.

Figure 6C:
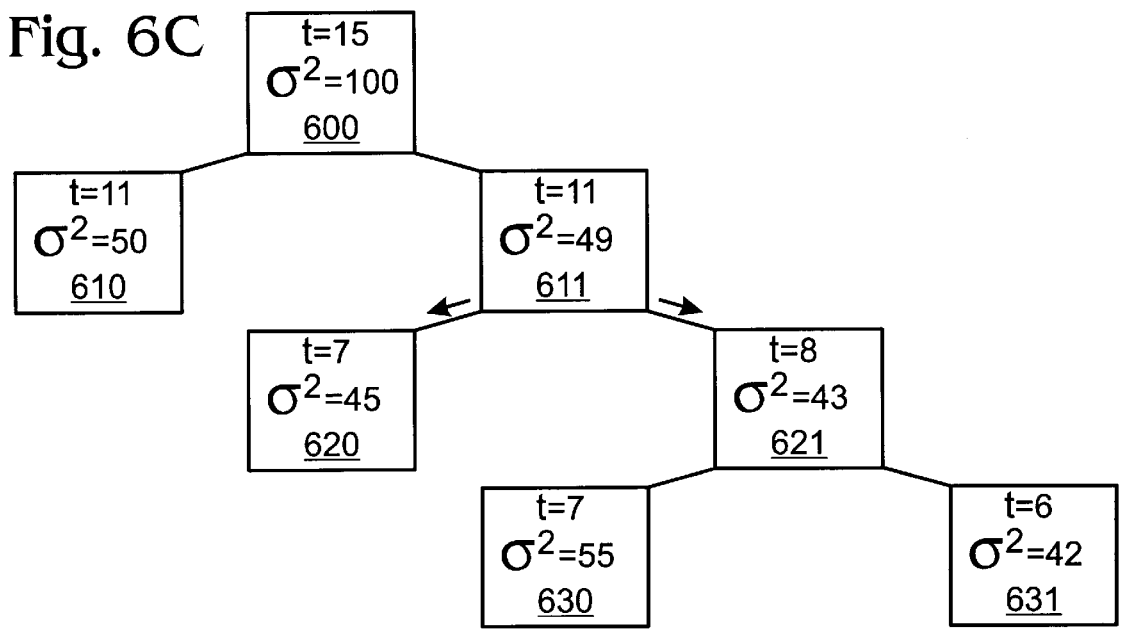

FIG. 6c is an expansion of node 621. Because both $\sigma^2=52$ in node 631 and $\sigma^2=55$ in node 630 are greater than $\sigma^2=45$ stored in node 611, the selection of node 621 was incorrect. Thus, the search tree is backtracked to node 620 is selected because node 620 is now the leaf node with the lowest variance.

Figure 6D:
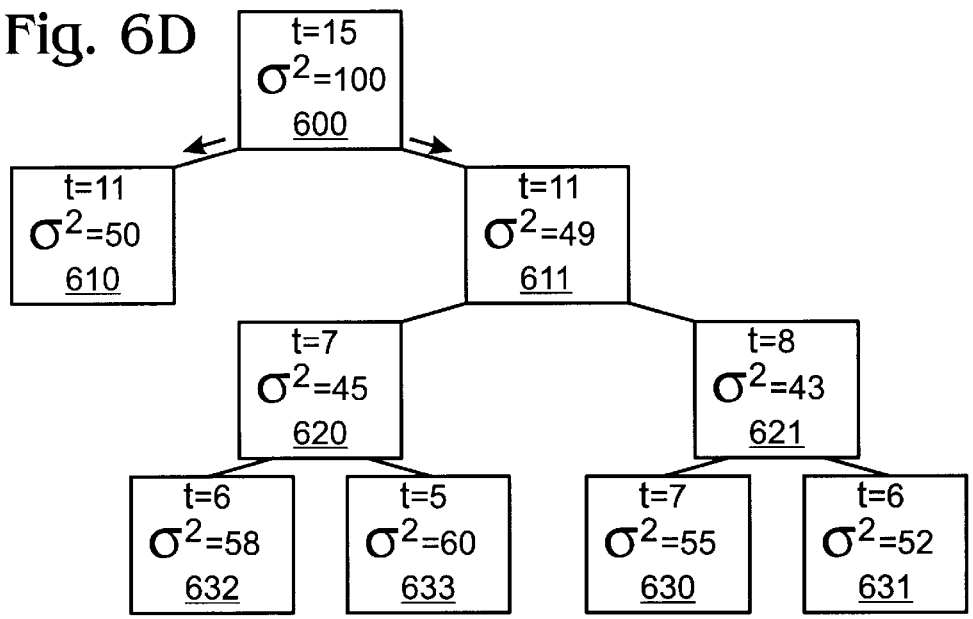

FIG. 6d is an expansion of node 620. Expansion of node 620 results in evaluation of node 632 with $\sigma^2=58$ and node 633 with $\sigma^2=60$. Thus, node 620 also lies on the incorrect path in the search tree. Because both children of node 611 lie in the incorrect path, node 611 does also, and the search tree is backtracked another level. Now the leaf node with the lowest variance is node 610, which is selected for expansion.

Figure 6E:
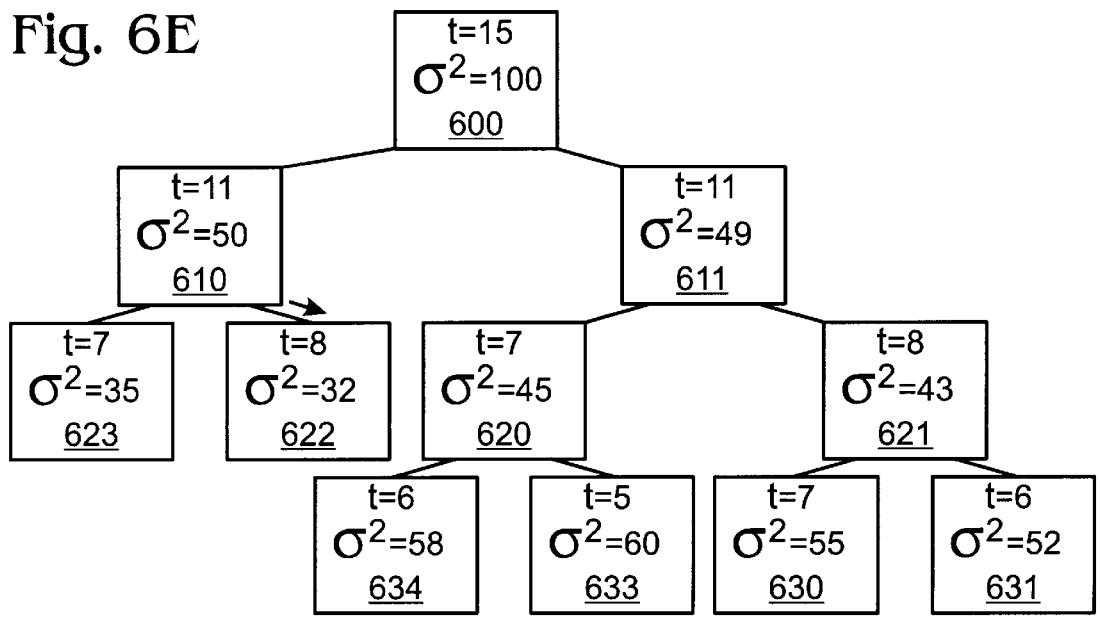

FIG. 6e is an expansion of node 610. Node 610 has two child nodes 623 and 622 that have $\sigma^2=35$ and $\sigma^2=32$, respectively. Node 622 is the leaf node with the lowest variance, thus node 622 is selected for expansion.

Figure 6F:
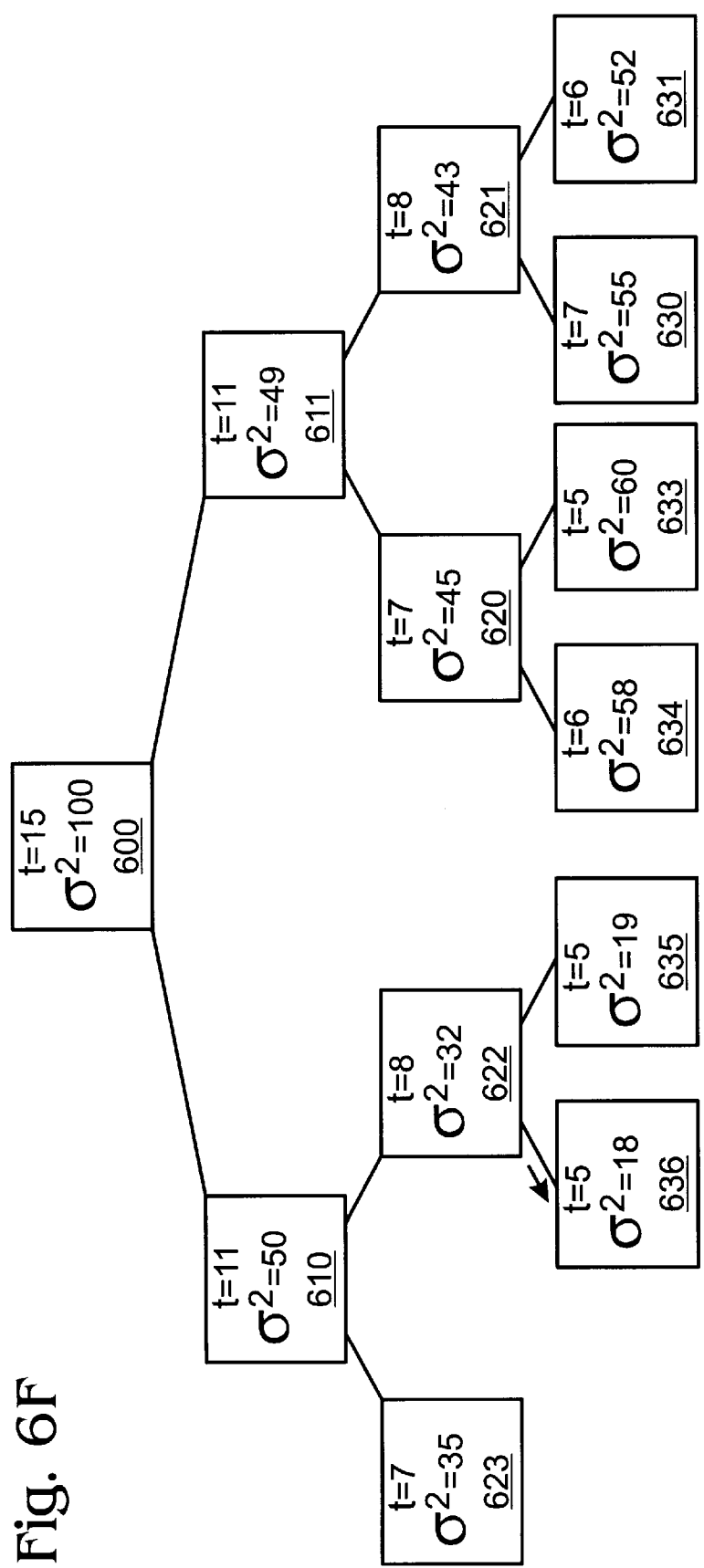

FIG. 6f is an expansion of node 622. Nodes 636 and 635 have $\sigma^2=18$ and $\sigma^2=19$, respectively, so node 636 is chosen for expansion.

Figure 6G:
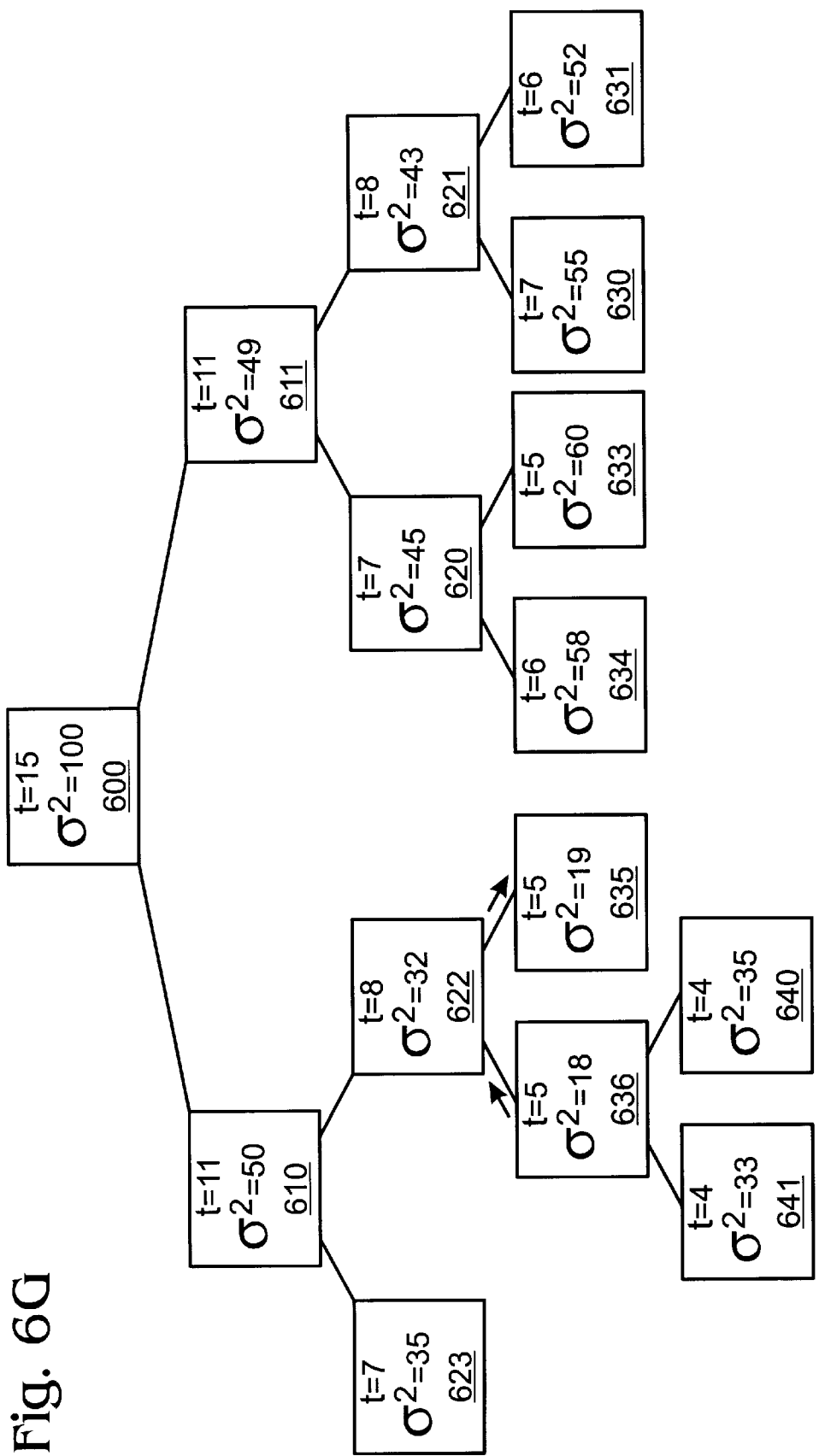

FIG. 6g is an expansion of node 636. Node 636 has two child nodes 640 and 641 with $\sigma^2=33$ and $\sigma^2=35$, respectively. Because the variances are of nodes 640 and 641 are greater than the variance of the parent of node 636, these nodes lie on the incorrect path. Node 635 is now the leaf node with the lowest variance, thus it is chosen for expansion.

Figure 6H:
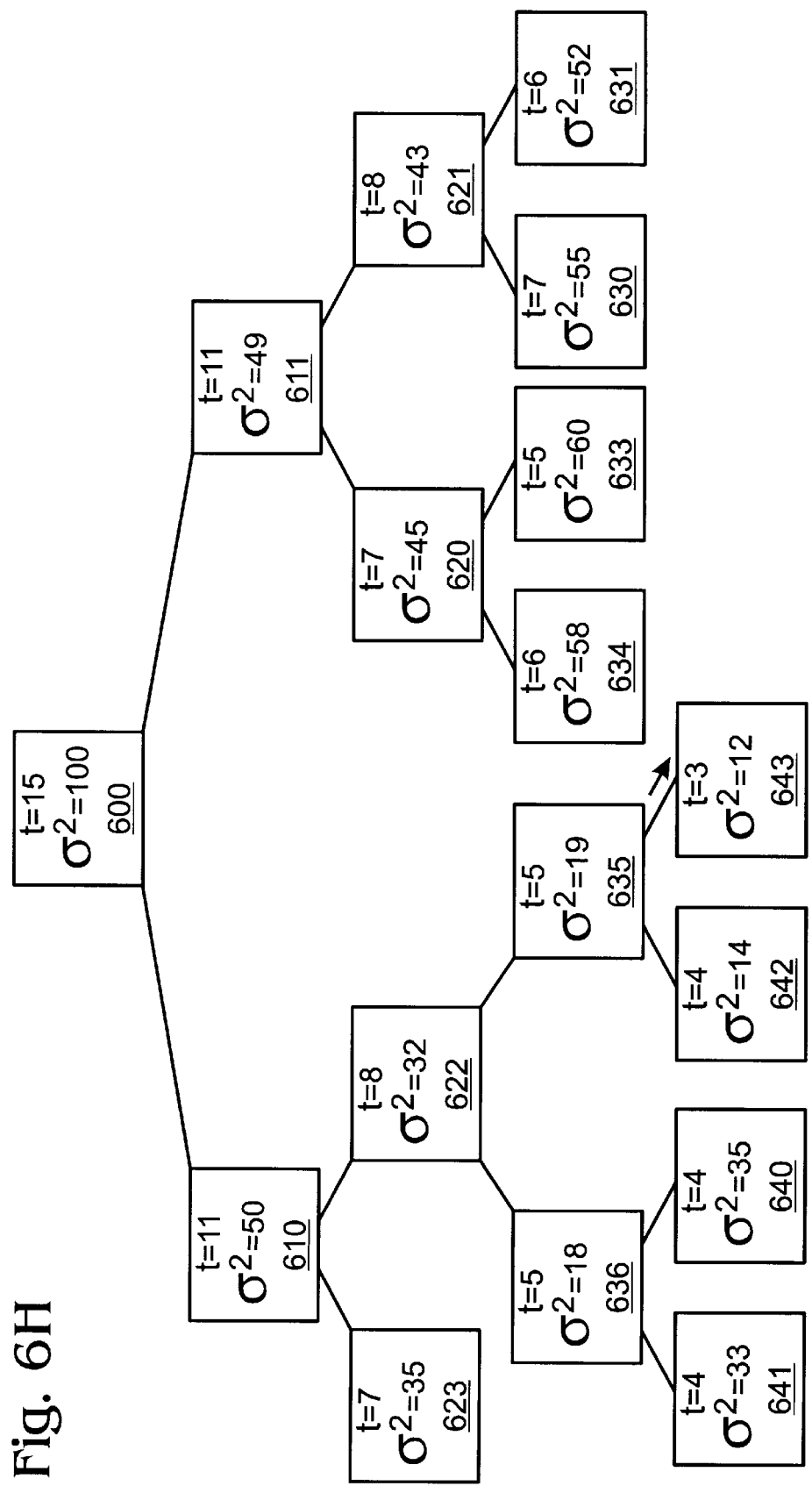

FIG. 6h is an expansion of node 635. The related node of node 635 having the lowest variance is node 643, so node 643 is chosen for expansion. Node 643 is at a depth of 5, which is the commit depth in this example. Thus, the first bit evaluated is committed. In this example, the first bit is clear, represented by the chosen path passing from node 600 to node 610. The first bit can now be used to begin decryption. Also, the portion of the search tree comprising node 600, node 611 and expansions from node 611 may be ignored because they lie on the incorrect path, thus freeing memory.

Figure 6I:
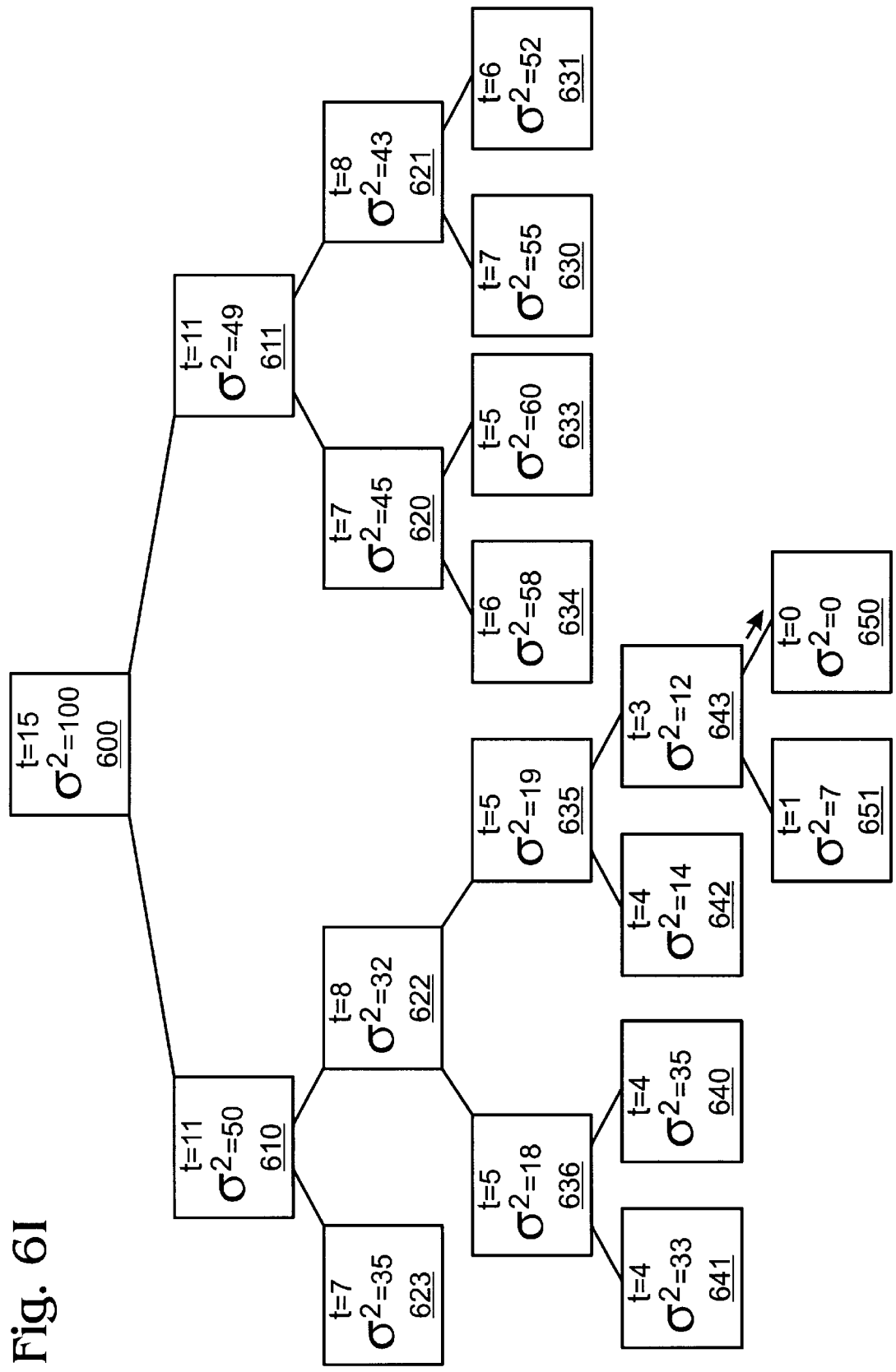

FIG. 6i is an expansion of node 643. One of the child nodes of node 643 has $\sigma^2=0$, which indicates the chosen bits matches the key. Thus, the path from node 600 to node 643 represents the key. This corresponds to a key of 01111.

In theory, the variance of the correct path is zero. However, in practice, the noise of errors in gathering timing information and other sources of noise, such as the cache state, may be larger than the signal variance at the end of the computation.

To counter the effects of this noise, random trailing pad bits may be added to the secret key where the number of pad bits is greater than or equal to the number of bits in the commit depth. This allows all of the bits of the key to be committed in the usual manner with the same degree of confidence as the earlier bits in the key. Of course, the addition of pad bits to the key requires more samples to compensate for the additional key bits.

A modification that may be used with longer keys to increase efficiency is to break the long key into two or more shorter segments, each having random padding. The final seed values for the first segment may be used as the initial seed values for the second segment. Timing values are generated for each segment. As the last bit of a preceding segment is committed, all nodes except for the committed node are cleared, discarding the pad bits. The timing values generated for the segment replace the timing values used in the preceding segment.

The effect of segmenting the key is a reduction in the number of samples required for each node, which saves memory space and evaluation time over the alternative of evaluating more samples. Additionally, the difficulty of finding the correct path is more difficult at the beginning of each segment where the number of samples per unknown bit is lower.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method comprising:

generating a plurality of timing statistics based on an amount of time required to evaluate a particular function given a known input for a series of computations used in deriving the cryptographic key:

deriving the cryptographic key in a bitwise fashion based, at least in part, on a comparison of the generated timing statistics and timing statistics stored in the electronic device to determine whether bits of a derived cryptographic key correspond to bits in the cryptographic key; and using a subset of the derived cryptographic key for authentication prior to complete derivation of the cryptographic key.

2. The method of claim 1, further comprising storing the timing statistics in the electronic device, such that the cryptographic key is not stored in the electronic device.

3. The method of claim 1, further comprising deriving the cryptographic key each time the cryptographic key is required.

4. The method of claim 1, wherein generating the plurality of timing statistics comprises:

generating a total expected time for derivation of the cryptographic key based on a plurality of starting values; and generating a variance of the total expected time.

5. The method of claim 1, wherein evaluating the function comprises finding a pseudo-prime number that is the lowest pseudo-prime number greater than the known input.

6. The method of claim 1, wherein evaluating the function comprises finding a prime number that is the lowest prime number greater than the known input.

7. A method comprising:

storing a plurality of timing statistics based on an amount of time required for a series of computations used in deriving the cryptographic key;

deriving the cryptogaphic key in a bitwise fashion in the electronic device by
(a) generating a predetermined number of seed values;
(b) evaluating a function for each of the predetermined number of seed values combined with a set bit, wherein the seed values combined with a set bit correspond to a first child node of a current node;
(c) evaluating the function for each of the predetermined number of seed values combined with a clear bit, wherein the seed values combined with a clear bit correspond to a second child node of the current node;
(d) computing a statistical measure for a time required for each evaluation corresponding to the first child node and the second child node;
(e) selecting between the first and second child nodes a parent node of the current node based on the statistical measure;
(f) repeating (b) through (f) until a third predetermined number of nodes have been selected; and
(g) repeating (f) a predetermined number of times;
using the timing statistics stored in the electronic device to determine whether the derived bits correspond to bits in the cryptographic key.

8. The method of claim 7, wherein the statistical measure is a variance.

9. A method for encoding a cryptographic key in an electronic device comprising:
(a) generating a plurality of seed values;
(b) combining one or more bits from a predetermined string of bits with a respective seed value;
(c) repeating (a) and (b) a predetermined number of times, wherein each iteration of (a) and (b) is designated as a sample;
(d) performing a function for each seed value;
(e) determining a period of time required to perform the functions for each seed value in a sample;
(f) repeating (d) through (f) for each sample;
(g) computing statistical measures based on the periods of time;
(h) storing the statistical measures in the electronic device.

10. The method of claim 9, wherein the seed values are random numbers of a predetermined size.

11. The method of claim 9, wherein the seed values are pseudo-random numbers of a predetermined size.

12. The method of claim 9, wherein the predetermined string comprises the cryptographic key of a predetermined size.

13. The method of claim 9, wherein the predetermined string comprises the cryptographic key of a first predetermined size combined with a set of bits of a second predetermined size.

14. The method of claim 9, wherein performing the function comprises determining a prime number greater than a particular seed value provided to the function.

15. The method of claim 9, wherein performing the function comprises determining a pseudo-prime number greater than a particular seed value provided to the function.

16. The method of claim 9, wherein the electronic device comprises a node in a video-on-demand network.

17. The method of claim 9, wherein the electronic device comprises a computer.

18. The method of claim 9, wherein the statistical measures comprise a total expected time required to derive the cryptographic key and a variance across the total expected time for the predetermined number of samples.

19. A method for hiding a cryptographic key in an electronic device comprising:
(a) generating a first plurality of seed values;
(b) combining one bit from a predetermined string of bits with a respective seed value;
(c) mixing an order of the seed values and bits;
(d) repeating (a) through (c) a predetermined number of times, wherein each iteration of (a) through (c) is designated as a sample;
(e) sending the samples and a function to the electronic device for evaluation;
(f) receiving, from the electronic device, results from the functions performed, a period of time required to perform the function for each result obtained, and a variance for each sample;
(g) placing the seed values and bits in an original order;
(h) selecting, from the first plurality of seed values for each sample, a subset of seed values corresponding to the cryptographic key;
(i) generating an expected period of time to perform the functions for the subset of seed values for the predetermined number of samples;
(j) generating a variance for the expected period of time to perform the functions for the predetermined number of samples; and
(k) sending the results from (i) and (j) in the electronic device.

20. The method of claim 19, wherein the seed values are random numbers of a predetermined size.

21. The method of claim 19, wherein the seed values are pseudo-random numbers of a predetermined size.

22. The method of claim 19, wherein the predetermined string comprises the cryptographic key of a predetermined size.

23. The method of claim 19, wherein the predetermined string comprises the cryptographic key of a first predetermined size combined with a set of bits of a second predetermined size.

24. The method of claim 19, wherein performing the function comprises determining a prime number greater than a particular seed value provided to the function.

25. The method of claim 19, wherein performing the function comprises determining a pseudo-prime number greater than a particular seed value provided to the function.

26. The method of claim 19, wherein the electronic device comprises a node in a video-on-demand network.

27. The method of claim 19, wherein the electronic device comprises a computer.

28. A method for deriving a cryptographic key in an electronic device having stored therein a plurality of statistics corresponding to a time required for a function to be evaluated for a first predetermined number of samples and a variance for the time for evaluation for each sample, wherein each sample comprises a second predetermined number of seed values, the method comprising:
(a) generating a second predetermined number of seed values;
(b) evaluating the function for each of the second predetermined number of seed values combined with a set bit, wherein the seed values combined with a set bit correspond to a first child node of a current node;
(c) evaluating the function for each of the second predetermined number of seed values combined with a clear bit, wherein the seed values combined with a clear bit correspond to a second child node of the current node;

(d) computing a statistical measure for a time required for each evaluation corresponding to the first child node and the second child node;

(e) selecting between the first and second child nodes a parent node of the current node based on the statistical measure;

(f) repeating (b) through (f) until a third predetermined number of nodes have been selected; and (g) repeating (f) a predetermined number of times.

29. The method of claim 28, wherein the statistical measure is a variance.

30. A device for controlling request and viewing of audio/video programming comprising a control unit configured to communicate with an audio/visual server and configured to generate an output, the device having associated with it a particular cryptographic key, wherein a plurality of original timing statistics previously generated to derivation of the cryptographic key based on evaluation of a given function having as an input a plurality of original seed values are stored in the device and the cryptographic key is not stored in the device, the device comprising:

a processor; and a memory coupled to the processor, wherein the device authenticates itself to the audio/visual server by evaluating the given function with a set of seed values and comparing the plurality of original timing statistics to a plurality of timing statistics generated in response to the set of seed values to determine whether bits of a derived cryptographic key correspond to bits in the cryptographic key.

31. A machine readable medium having stored thereon sequences of instructions that when executed by one or more processors cause one or more electronic devices to:

generate a plurality of timing statistics based on an amount of time required to evaluate a particular function given a known input for a series of computations used in deriving the cryptographic key;

derive the cryptographic key in a bitwise fashion based, at least in part, on a comparison of the generated timing statistics and timing statistics stored in the electronic device to determine whether bits of a derived cryptographic key correspond to bits in the cryptographic key; and use a subset of the derived cryptographic key for authentication prior to complete derivation of the cryptographic key.

32. The machine readable medium of claim 31, wherein the sequence of instructions that cause the one or more electronic devices to evaluate the function further comprise sequences of instructions that when executed cause the one or more electronic devices to find a pseudo-prime number that is the lowest pseudo-prime number greater than the known input.

33. The machine readable medium of claim 31, wherein the sequence of instructions that cause the one or more electronic devices to evaluate the function further comprise sequences of instructions that when executed cause the one or more electronic devices to find a pseudo-prime number that is the lowest prime number greater than the known input.

34. A machine readable medium having stored thereon sequences of instruction that, when executed by one or more processors, cause one or more electronic devices to:

generate the plurality of timing statistics based on an amount of time required for a series of computations used in deriving the cryptographic key;

derive the cryptographic key in a bitwise fashion in the electronic device by (a) generating a predetermined number of seed values;

(b) evaluating a function for each of the predetermined number of seed values combined with a set bit, wherein the seed values combined with a set bit correspond to a first child node of a current node;

(c) evaluating the function for each of the predetermined number of seed values combined with a clear bit, wherein the seed values combined with a clear bit correspond to a second child node of the current node;

(d) computing a statistical measure for a time required for each evaluation corresponding to the first child node and the second child node;

(e) selecting between the first and second child nodes a parent node of the current node based on the statistical measure;

(f) repeating (b) through (f) until a third predetermined number of nodes have been selected; and (g) repeating (f) a predetermined number of times;

use the timing statistics stored in the electronic device to determine whether the derived bits correspond to bits in the cryptographic key.

35. The machine readable medium of claim 34, wherein the statistical measure is a variance.

36. A machine readable medium having stored thereon sequences of instruction that, when executed by one or more processors, cause one or more electronic devices to:

(a) generate a plurality of seed values;

(b) combine one or more bits from a predetermined string of bits with a respective seed value;

(c) repeat (a) and (b) a predetermined number of times, wherein each iteration of (a) and (b) is designated as a sample;

(d) perform a function for each seed value;

(e) determine a period of time required to perform the functions for each seed value in a sample;

(f) repeat (d) through (f) for each sample;

(g) compute statistical measures based on the periods of time;

(h) store the results from (g) in the electronic device.

37. The machine readable medium of claim 36, wherein the seed values are random numbers of a predetermined size.

38. The machine readable medium of claim 36, wherein the seed values are pseudo-random numbers of a predetermined size.

39. The machine readable medium of claim 36, wherein the predetermined string comprises the cryptographic key of a predetermined size.

40. The machine readable medium of claim 36, wherein the predetermined string comprises the cryptographic key of a first predetermined size combined with a set of bits of a second predetermined size.

41. The machine readable medium of claim 36, wherein the sequences of instructions that cause the one or more electronic devices to perform the function comprises sequences of instructions that cause the one or more electronic devices to determine a prime number greater than a particular seed value provided to the function.

42. The machine readable medium of claim 36, wherein the sequences of instructions that cause the one or more electronic devices to perform the function comprise sequences of instructions that cause the one or more electronic devices to determine a pseudo-prime number greater than a particular seed value provided to the function.

43. The machine readable medium of claim 36, wherein at least one of the one or more electronic devices comprises a node in a video-on-demand network.

44. The machine readable medium of claim 36, wherein at least one of the one or more electronic devices comprises a computer system.

45. The machine readable medium of claim 36, wherein the statistical measures comprise a total expected time required to derive the cryptographic key and a variance across the total expected time for the predetermined number of samples.

46. A machine readable medium having stored thereon sequences of instruction that, when executed by one or more processors, cause one or more electronic devices to:

(a) generate a first plurality of seed values;

(b) combine one bit from a predetermined string of bits with a respective seed value;

(c) mix an order of the seed values and bits;

(d) repeat (a) through (c) a predetermined number of times, wherein each iteration of (a) through (c) is designated as a sample;

(e) send the samples and a function to the electronic device for evaluation;

(f) receive, from the electronic device, results from the functions performed, a period of time required to perform the function for each result obtained, and a variance for each sample;

(g) place the seed values and bits in an original order;

(h) select, from the first plurality of seed values for each sample, a subset of seed values corresponding to the cryptographic key;

(i) generate an expected period of time to perform the functions for the subset of seed values for the predetermined number of samples;

(j) generate a variance for the expected period of time to perform the functions for the predetermined number of samples; and (k) send the results from (i) and 0) in the electronic device.

47. The machine readable medium of claim 46, wherein the seed values are random numbers of a predetermined size.

48. The machine readable medium of claim 46, wherein the seed values are pseudo-random numbers of a predetermined size.

49. The machine readable medium of claim 46, wherein the predetermined string comprises the cryptographic key of a predetermined size.

50. The machine readable medium of claim 46, wherein the predetermined string comprises the cryptographic key of a first predetermined size combined with a set of bits of a second predetermined size.

51. The machine readable medium of claim 46, wherein the sequences of instructions that cause the one or more electronic devices to perform the function comprises the step of determining a prime number greater than a particular seed value provided to the function.

52. The machine readable medium of claim 46, wherein the sequences of instructions that cause the one or more electronic devices to perform the function comprise sequences of instructions that cause the one or more electronic devices to determine a pseudo-prime number greater than a particular seed value provided to the function.

53. The machine readable medium of claim 46, wherein the electronic device comprises a node in a video-on-demand network.

54. The machine readable medium of claim 46, wherein the electronic device comprises a computer.

55. A machine readable medium having sequences of instructions, that when executed, cause one or more electronic devices to derive a cryptographic key based, at least in part, on statistics corresponding to a time required for a function to be evaluated for a first predetermined number of samples and a variance for the time for evaluation for each sample, wherein each sample comprises a second predetermined number of seed values, the sequences of instructions causing the one or more electronic devices to:

(a) generate a second predetermined number of seed values;

(b) evaluate the function for each of the second predetermined number of seed values combined with a set bit, wherein the seed values combined with a set bit correspond to a first child node of a current node;

(c) evaluate the function for each of the second predetermined number of seed values combined with a clear bit, wherein the seed values combined with a clear bit correspond to a second child node of the current node;

(d) compute a statistical measure for a time required for each evaluation corresponding to the first child node and the second child node;

(e) select between the first and second child nodes a parent node of the current node based on the statistical measure;

(f) repeat (b) through (f) until a third predetermined number of nodes have been selected; and (g) repeat (f) a predetermined number of times.

56. The machine readable medium of claim 55, wherein the statistical measure is a variance.

* * * * *

UNITED STATES PATENT AND TRADEMARK OFFICE
CERTIFICATE OF CORRECTION

PATENT NO. : 6,041,122
DATED     : March 21, 2000
INVENTOR(S) : David Aucsmith, et al It is certified that error appears in the above-identified patent and that said Letters Patent is hereby corrected as shown below:

On the title page, item [54] and Column 1, line 1,

METHOD AND APPARATUS FOR HIDING CRYTOGRAPHIC KEYS UTILIZING AUTOCORRELATION TIMING ENCODING AND COMPUTATION should read METHOD AND APPARATUS FOR HIDING CRYPTOGRAPHIC KEYS UTILIZING AUTOCORRELATION TIMING ENCODING AND COMPUTATION Signed and Sealed this Eighteenth Day of July, 2000

Attest:

Q. TODD DICKINSON

*Attesting Officer*   *Director of Patents and Trademarks*

UNITED STATES PATENT AND TRADEMARK OFFICE
CERTIFICATE OF CORRECTION

PATENT NO.  : 6,041,122
DATED       : March 21, 2000
INVENTOR(S) : Graunke et al.

It is certified that error appears in the above-identified patent and that said Letters Patent is hereby corrected as shown below:

In column 1, at line 67, delete "$Z = Y_B^{AA} \bmod p$" and insert --$Z = Y_B^{XA} \bmod p$--.

In column 11, at line 8, delete "t" and insert--$\hat{t}$

Signed and Sealed this

Sixth Day of March, 2001

Attest:

NICHOLAS P. GODICI

Attesting Officer

Acting Director of the United States Patent and Trademark Office